US008957840B2

(12) United States Patent
Shin et al.

(10) Patent No.: US 8,957,840 B2
(45) Date of Patent: Feb. 17, 2015

(54) LIQUID CRYSTAL DISPLAY DEVICE FOR COMPENSATING A PIXEL DATA IN ACCORDANCE WITH AREAS OF A LIQUID CRYSTAL DISPLAY PANEL AND SUB-FRAMES, AND DRIVING METHOD THEREOF

(75) Inventors: Hyun Ho Shin, Gyeonggi-do (KR); Ki Duk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/347,393

(22) Filed: Jan. 10, 2012

(65) Prior Publication Data
US 2012/0105513 A1 May 3, 2012

Related U.S. Application Data (63) Continuation of application No. 11/880,683, filed on Jul. 23, 2007, now Pat. No. 8,115,725.

(30) Foreign Application Priority Data

Dec. 28, 2006 (KR) .............................. 2006/0136164

(51) Int. Cl.
*G09G 3/36* (2006.01)
*G02F 1/1335* (2006.01)
*G02F 1/1343* (2006.01)

(52) U.S. Cl.
CPC .. *G09G 3/3607* (2013.01); *G02F 2001/133622* (2013.01); *G02F 2001/134345* (2013.01);
(Continued)

(58) Field of Classification Search
CPC ............. G09G 3/2074; G09G 3/3648–3/3696; G09G 2310/02–2310/021; G09G 2310/0243; G09G 3/20; G09G 3/2003; G09G 3/2022–3/2037; G09G 3/204; G09G 3/2041; G09G 3/3607–3/3618; G09G 2320/0247; G09G 2330/0673; G09G 5/28; G09G 2300/0452; G06T 11/203
USPC .................................. 345/87–104, 690, 694
See application file for complete search history.

(56) References Cited

U.S. PATENT DOCUMENTS

2005/0036075 A1 2/2005 Taoka et al.
2006/0232545 A1 10/2006 Sakiguchi
(Continued)

FOREIGN PATENT DOCUMENTS

JP 2006-301043 11/2006
KR 1020040084777 A 10/2004
(Continued)

OTHER PUBLICATIONS

Office Action issued in corresponding Korean Patent Application No. 10-2006-0136164, mailed Oct. 30, 2013, 6 pages.

*Primary Examiner* — Sanghyuk Park
(74) *Attorney, Agent, or Firm* — Brinks Gilson & Lione (57) ABSTRACT

A liquid crystal display device includes a liquid crystal panel, a timing controller, a compensation unit and a panel drive circuit. The liquid crystal panel has a plurality of color pixels, each of the color pixels including two sub-pixels which represent two different colors. The timing controller generates a sub-pixel data stream of two sub-frame format. The sub-pixel data stream of two sub-frame format includes a first sub-pixel data for a first sub-frame and a second sub-pixel data for a second sub-frame. The first sub-pixel data and the second sub-pixel data have different gamma characteristics. The compensation unit is operable to compensate the first sub-pixel data and the second sub-pixel data with different rates. The panel drive circuit drives the sub-pixels on the liquid crystal panel and supplies the sub-pixels with the compensated first sub-pixel data for the first sub-frame and the compensated second sub-pixel data for the second sub-frame.

11 Claims, 5 Drawing Sheets (52) U.S. Cl.
CPC ............... *G09G2310/0235* (2013.01); *G09G 2320/0252* (2013.01); *G09G 2320/0285* (2013.01); *G09G 2320/0673* (2013.01); *G09G 2340/16* (2013.01)
USPC ........................................... 345/89; 345/690

(56) References Cited

U.S. PATENT DOCUMENTS

| | | | |
|---|---|---|---|
| 2007/0132680 A1* | 6/2007 | Kagawa et al. | 345/84 |
| 2007/0195047 A1* | 8/2007 | Cho | 345/98 |
| 2007/0273677 A1* | 11/2007 | Kim | 345/204 |
| 2008/0018571 A1* | 1/2008 | Feng | 345/87 |
| 2008/0158443 A1* | 7/2008 | Shiomi | 348/790 |
| 2008/0284699 A1 | 11/2008 | Yano et al. | |

FOREIGN PATENT DOCUMENTS

| | | | | |
|---|---|---|---|---|
| WO | WO 2006098246 A1 * | 9/2006 | | |
| WO | WO 2006135025 A1 * | 12/2006 | ............... | G09G 3/36 |

* cited by examiner

LIQUID CRYSTAL DISPLAY DEVICE FOR COMPENSATING A PIXEL DATA IN ACCORDANCE WITH AREAS OF A LIQUID CRYSTAL DISPLAY PANEL AND SUB-FRAMES, AND DRIVING METHOD THEREOF

The present patent document is a continuation of U.S. patent application Ser. No. 11/880,683, filed Jul. 23, 2007 now U.S. Pat. No. 8,115,725, which claims priority to Korean Patent Application No. 0136164/2006 filed in Korea on Dec. 28, 2006, which are hereby incorporated by reference.

BACKGROUND

1. Field of the Invention

The present invention relates to a liquid crystal display device and in particular, to a liquid crystal display device and a driving method for controlling the transmittance of the liquid crystal to display a color image.

2. Discussion of the Related Art

A liquid crystal display device includes a liquid crystal panel and a driving circuit panel. The liquid crystal display device controls the quantity of light which penetrate a liquid crystal panel. A backlight provides the light. The liquid crystal panel includes a plurality of pixels arranged in a matrix and a plurality of thin film transistors. The thin film transistors switch data signals which are supplied to each of the pixels.

The liquid crystal panel may include one of two types of color filters. One type includes color filters of R, G and B, and the other type is color filters of cyan and yellow. The liquid crystal display device, which includes the liquid crystal panel with the color filters of cyan and yellow, may display images having four colors.

Figure 1:
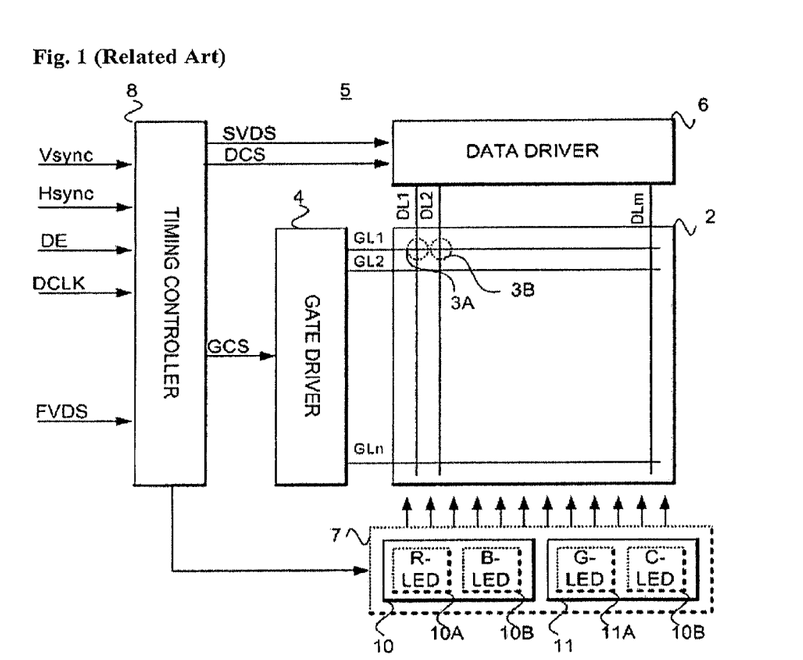
FIG. 1 is a block diagram illustrating a liquid crystal display device of the related art.

FIG. 1 is a block diagram illustrating a liquid crystal display device 5 having a liquid crystal display panel with two color filters of cyan and yellow in the related art. In FIG. 1, the liquid crystal display device 5 includes the liquid crystal panel 2 having two kind color filters, a gate driver 4, a data driver 6, a backlight unit 7 and a timing controller 8. The gate driver 4 and the data driver 6 drive the liquid crystal panel 2. The backlight unit 7 irradiates light to the liquid crystal panel 2. The timing controller 8 operates to control the backlight unit 7, the gate driver 4 and the data driver 6. The timing controller 8 divides a frame into two sub-frames, i.e. a first sub-frame and a second sub-frame.

The liquid crystal panel 2 is provided with a first color filter of cyan 3A and a second color filter of yellow 3B. The first and second color filters 3A and 3B form a color filter (not illustrated) as they are arranged repeatedly in the vertical and horizontal directions. Accordingly, each of the color pixels includes cyan sub-pixels and yellow sub-pixels in the liquid crystal panel of the two kind color filters. The liquid crystal panel 2 having the first and the second color filters 3A and 3B displays color images as the quantity of the penetration of four kind color lights is controlled. The four color lights are irradiated alternately from the backlight unit 7 by using two color lights. The backlight unit 7 includes a first LED array 10 having red light emitting diodes 10A producing red light and blue light emitting diodes 10B producing blue light; and a second LED array 11 having green light emitting diodes 11A producing green light and cyan light emitting diodes 11B producing cyan light. The first LED array 10 emits light during the first sub-frame (for example, an odd-numbered sub-frame), and the second LED array 11 irradiates light during the second sub-frame (for example, an even-numbered sub-frame). The backlight unit 7 alternately switches the first and second LED arrays 10, 11 of each sub-frame under the control of the timing controller 8. In this way, one color image is displayed on the liquid crystal panel 2 based on the penetration quantity of the red and blue lights and the green and cyan lights. The red and blue lights are irradiated to the liquid crystal panel 2 from the first LED array 10 during the first sub-frame and the green and cyan lights are irradiated to the liquid crystal panel 2 from the second LED array 11 during the second sub-frame.

The timing controller 8 controls the gate driver 4 and the data driver 6, and controls the sub-pixel drive signals that are supplied to the cyan and yellow sub-pixels. The cyan and yellow sub-pixels form each of the color pixels of the liquid crystal panel 2 one by one during the first and second sub-frames of the first frame period. Simultaneously, the timing controller 8 controls each of the red and blue lights and the cyan and green lights to be irradiated to the liquid crystal panel 2 one by one in turns in accordance with the first and the second sub-frame during the first frame period. Accordingly, the liquid crystal panel 2 displays one color image corresponding to the video data during one frame.

Figure 2:
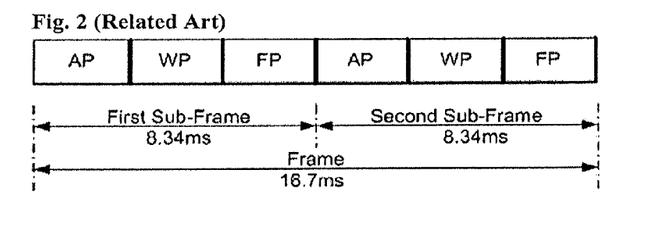
FIG. 2 illustrates a drive timing of the liquid crystal display device of FIG. 1.

FIG. 2 illustrates the frame divided into the first sub-frame and the second sub-frame. The timing controller 8 divides the single frame period into the first and second sub-frames. Accordingly, each of the first and the second sub-frames corresponds to the half of the frame period. By way of example, the single frame period is 16.67 ms, and each of the first and the second sub-frames becomes 8.34 ms.

For each of the first and the second sub-frames, the sub-pixel drive signals are written one at a time on all of the cyan and yellow sub-pixels of the liquid crystal panel 2. The difference between the sub-pixel drive signal during the first sub-frame period and the sub-pixel drive signal during the second sub-frame period may be gamma characteristics due to different color composition. The difference in the gamma characteristics of the sub-pixel drive signals may affect color reproduction rate of image corresponding to video data.

Each of the first and second sub-frame periods is divided into the data write period AP, the liquid crystal response period WP and the backlight light-emitting period FP. On the other hand, liquid crystal cells mainly forming the sub-pixel in the liquid crystal panel 2 have the same response speed throughout the liquid crystal panel 2. When light emitted from the backlight unit 7 reaches the liquid crystal panel 2, the liquid crystal cells at the upper end area of the liquid crystal panel 2 may be arranged in a state corresponding to the voltage of the respective sub-pixel drive signal, while the liquid crystal cells at the lower end area may not be arranged in a state corresponding to the voltage of the respective sub-pixel drive signal. Accordingly, an image of unintended brightness and color may be displayed on the lower end area of the liquid crystal panel 2.

The unevenness of brightness and colors may be caused by the limited response speed in the liquid crystal display device of two kind color filters. Furthermore, the color reproduction rate of images may be lowered because of the difference in the gamma characteristic between the sub-pixel drive signals of the two sub-frames. The image quality displayed by the liquid crystal display device of two kind color filters may be lowered. Accordingly, there is a need for a liquid crystal display device and a driving method that overcome drawbacks of the related art.

BRIEF SUMMARY

By way of example, in a first embodiment, a liquid crystal display device includes a liquid crystal panel, a timing controller, a compensation unit and a panel drive circuit. The liquid crystal panel has a plurality of color pixels, each of the color pixels including two sub-pixels which represent two different colors. The timing controller generates a sub-pixel data stream of two sub-frame format. The sub-pixel data stream of two sub-frame format includes a first sub-pixel data for a first sub-frame and a second sub-pixel data for a second sub-frame. The first sub-pixel data and the second sub-pixel data have different gamma characteristics. The compensation unit is operable to compensate the first sub-pixel data and the second sub-pixel data with different rates. The panel drive circuit drives the sub-pixels on the liquid crystal panel and supplies the sub-pixels with the compensated first sub-pixel data for the first sub-frame and the compensated second sub-pixel data for the second sub-frame In a second embodiment, a method for driving a liquid crystal display device is provided. A sub-pixel data stream of two sub-frame format is received. The sub-pixel data stream of two sub-frame format represents a first gamma characteristic during one sub-frame and a second gamma characteristic during the other sub-frame. The sub-pixel data stream is compensated with a varying compensation rate. The compensated sub-pixel data stream is supplied to a liquid crystal panel having a plurality of gate lines, a plurality of data lines intersecting the gate lines and a plurality of color pixels. Each of the color pixels includes two sub-pixels representing different colors. The sub-pixels on the liquid crystal panel is driven with the compensated sub-pixel data stream twice per frame.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE DRAWINGS AND THE PRESENTLY PREFERRED EMBODIMENTS

Reference will now be made in detail as for the preferred embodiments of the present invention with reference to the accompanying drawings.

Figure 3:
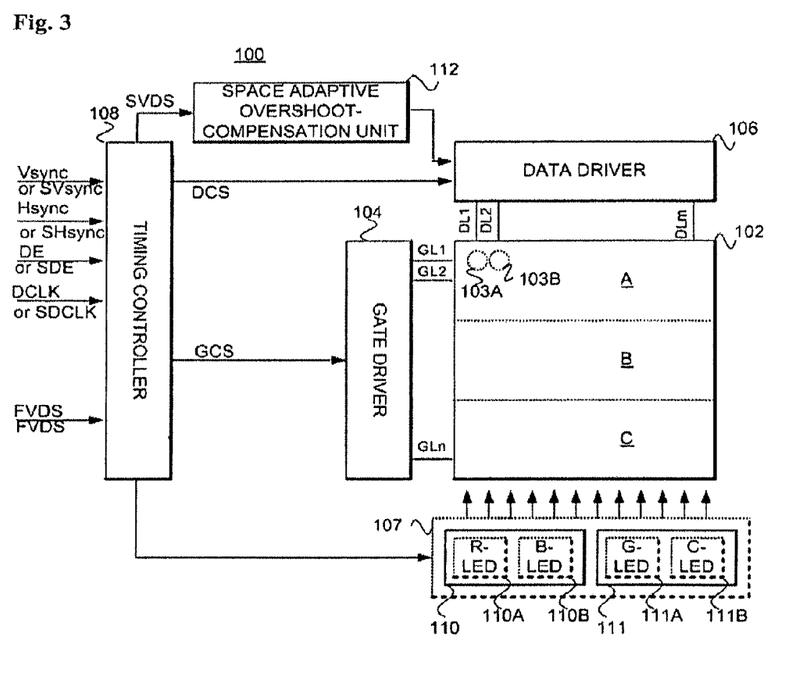
FIG. 3 is a block diagram illustrating a liquid crystal display device according to a first embodiment.

FIG. 3 is a block diagram illustrating a liquid crystal display device 100 according to a first embodiment. The liquid crystal display device 100 of FIG. 3 includes a gate driver 104 and a data driver 106 for driving a liquid crystal panel 102 of two-color filter type, and a backlight unit 107 irradiating the lights of first and second groups to the rear surface of the liquid crystal panel 102 in turns. The light of the first group includes red and blue lights, and the light of the second group includes green and cyan lights. Further, the liquid crystal display device 100 includes a timing controller 108 controlling the gate driver 104, the data driver 106 and the backlight unit 107. The liquid crystal display device 100 further includes a space (or multi-dimensional) adaptive overshoot-compensation unit 112 connected to the timing controller 108 and the data driver 104. The unit 112 spatially-compensates the sub-pixel data stream SVDS to be supplied to the data driver 104 from the timing controller 108.

The liquid crystal panel 102 includes sub-pixels formed at the intersection of a plurality of gate lines GL1~GLn and a plurality of data lines DL1~DLm. Each of the sub-pixels has a thin film transistor (TFT) formed at the intersection of the corresponding gate line (GL) and the corresponding data line (DL), and a liquid crystal cell (Clc) connected between the thin film transistor (TFT) and the common electrode (Vcom). Further, the liquid crystal panel 102 has cyan and yellow filters 103A and 103B repeatedly arranged in the horizontal and vertical directions. The liquid crystal panel 102 has a first substrate on which a thin film transistor (TFT) is formed and a second substrate on which the common electrode is formed. Cyan and yellow filters 103A and 103B are formed on the second substrate. A liquid crystal layer is arranged between the first and the second substrates. The color pixel of the liquid crystal panel 102 of two-color filter type includes a yellow sub-pixel and a cyan sub-pixel.

The thin film transistor TFT switches a sub-pixel drive signal to be supplied to the corresponding liquid crystal cells Clc from the corresponding data line DL in response to the gate signals (or scan signals) on the corresponding gate line GL. The liquid crystal cell Clc includes a common electrode Vcom facing a pixel electrode with the liquid crystal layer interposed therebetween. The pixel electrode is connected to the thin film transistor TFT. The liquid crystal cell Clc is charged with the voltage of the sub-pixel drive signal. The voltage charged at the liquid crystal cell Clc is renewed every time the corresponding thin film transistor TFT is turned on. Further, each of the sub-pixels on the liquid crystal panel 102 has a storage capacity Cst connected between the thin film transistor TFT and the previous gate line. The storage capacity Cst may minimize the natural loss of the voltage charged at the liquid crystal cell Clc.

The gate driver 104 supplies a plurality of gate signals to the corresponding plurality of gate lines GL1 to GLn in response to the gate controlling signals GCS from the timing controller 108. The plurality of gate signals enables each of the plurality of gate lines in sequence during the period or interval of one sub-horizontal sync signal. The sub-horizontal sync signal SHsync has frequency twice as much as that of the horizontal sync signal Hsync (i.e. period corresponding to about one half). The gate controlling signals GCS include a gate start pulse and at least one gate clock. The gate start pulse is produced every period of the sub-vertical sync signal, and the gate clock has frequency (period) that is the same as that of the sub-horizontal sync signal SHsync.

The data driver 106 supplies a plurality of sub-pixel drive signals to the plurality of data lines DL1 to DLm every time one of the plural gate lines (GL1 to GLn) is enabled in response to the data controlling signals DCS from the timing controller 108. The data driver 106 inputs the sub-pixel data SVDS for one line from the timing controller 110 at every period of the sub-horizontal sync signal. The sub-pixel data SVDS are converted into analog signals. The sub-pixel drive signals for a first line, which is converted from digital into analog, may have alternating voltages of a positive polarity and a negative polarity with reference to the common voltage on the common electrode at every sub-frame. To generate the sub-pixel drive signals of the positive and negative polarities, the data driver 106 responds to a polarity inversion signal POL from the timing controller 108. For the conversion of digital to analog, the data driver 106 uses a gamma voltage set. The analog signals are supplied to the plural data lines DL.

The timing controller 108 generates gate control signals GCS, data control signals DCS, polarity inversion signal POL and lighting control signals as using data clock DCLK, horizontal sync signal Hsync, vertical sync signal Vsync and data enable signal DE from an external video source (for example, a graphic module of a computer system or an image demodulation module of a television receiver). The gate control signals GCS are supplied to the gate driver 104, and the data control signals DCS and polarity inversion signal POL are supplied to the data driver 106. The data control signals DCS includes sub-data clock SDCLK, sub-data enable signal SDE and so forth. The sub-data clock SDCLK has a frequency (the period of a half) which ranges one and half or twice as much as that of the data clock DCLK, and the sub-data enable signal SDE has frequency (the period of a half) twice as much as that of the data enable signal. The timing controller 108 forms sub-data clock SDCLK, sub-horizontal sync signal SHsync, sub-vertical sync signal SVsync and sub-data enable signal SDE by frequency-multiplying the data clock DCLK, the horizontal sync signal Hsync, the vertical sync signal, and the data enable signal DE from the external video source. The timing controller 108 generates the gate control signals GCS, the data control signals DCS, the polarity inversion signal POL and the lighting control signals by using the sub-data clock SDCLK, the sub-horizontal sync signal SHsync, the sub-vertical sync signal SVsync and the sub-data enable signal SDE.

Furthermore, the timing controller 108 inputs a sub-pixel data stream FVDS of one frame format synchronized with the data clock, the horizontal sync signal Hsync, the vertical sync signal Vsync, and the data enable signal DE. The sub-pixel data stream FVDS of one frame format includes red, green and blue color sub-pixel data for one frame. The timing controller 108 forms a sub-pixel data stream SVDS of two sub-frame format from the sub-pixel data stream FVDS of one frame format. The sub-pixel data stream SVDS includes yellow and cyan sub-pixel data stream for the first sub-frame (for example, the odd-numbered sub-frame) and the yellow and cyan sub-pixel data stream for the second sub-frame (for example, the even-numbered sub-frame). The sub-pixel data stream of the first sub-frame is supplied to the data driver 104 by one line in order during the first frame period (the period of the odd-numbered sub-frame), and the sub-pixel data stream of the second sub-frame is supplied to the data driver 104 by one line in order during the second frame period (the period of the even-numbered sub-frame). The sub-pixel data of the first sub-frame and the sub-pixel data of the second sub-frame include color ingredients different from each other. Therefore, the first and the second sub-pixel data have gamma characteristics different from each other.

Accordingly, the timing controller 108 converts or transforms the sync signals of one frame-single driving system into the sync signals of one frame-double driving (two sub-frame driving) system. The timing controller 108 also converts or transforms the video data FVDS of three-color filter system into the video data SVDS of the two-color filter system. That is, the timing controller 108 separates the first frame period into a first and a second sub-frames (an odd-numbered and even-numbered sub-frame), and displays a color image by driving the two-color filter type liquid crystal panel twice for one frame. Each of the sub-pixels on the liquid crystal panel 102 of two-color filter type is driven once for each sub-frame under the control of the timing controller 108.

Alternatively, the timing controller 108 may receive the sub-pixel data stream SVDS and sync signals for the liquid crystal panel 102 of the two-color filter type from an external video source. In this case, the sub-data clock SDCLK, the sub-horizontal sync signals SHsync, the sub-vertical sync signal SVsync and the sub-data enable signals SDE are input to the timing controller 108. The sub-pixel data stream SVDS including the sub-pixel data stream of the first sub-frame and the sub-pixel data stream of the second sub-frame also is input the timing controller 108. The timing controller 108 generates the gate control signals GCS, the data control signals DCS, the polarity inversion signal POL and the lighting control signals by using the sub-data clock SDCLK, the sub-horizontal sync signal SHsync, the sub-vertical sync signal SVsync, and the sub-data enable signal SDE.

The backlight unit 107 includes a first LED array 110 irradiating lights of the first group and a second LED array 111 irradiating lights of the second group. The first LED array 110 includes red light emitting diodes 110A emitting red lights and blue light emitting diodes 110B emitting blue lights. The second LED array 111 includes green light emitting diodes 111A emitting green lights and cyan light emitting diodes 111B emitting cyan lights. The first LED array 110 irradiates red and blue lights to be irradiated to the rear of the liquid crystal panel 102 during the first sub-frame period (the odd-numbered sub-frame period) by the first lighting control signal among the lighting control signals from the timing controller 108. The second LED array 111 irradiates green and cyan lights to be irradiated to the rear of the liquid crystal panel 102 during the second sub-frame period (the even-numbered sub-frame period) by the second lighting control signal among the lighting control signals from the timing controller 108. One color image corresponding to the video data FVDS of the one frame format is displayed on the liquid display panel 102 through the mixture of the amount of the red and blue lights passed through the liquid crystal panel 102 during the first sub-frame (the odd-numbered sub-frame period) and the amount of the green and cyan lights passed through the liquid crystal panel 102 during the second sub-frame period (the even-numbered sub-frame period).

The space (or multi-dimension) adaptive overshoot-compensation unit 112 overshoot-compensates the sub-pixel data SVDS to be supplied to the data driver 106 from the timing controller 108 with different compensation rates in accordance with the area of the liquid crystal panel 102 and the sub-frame. For instance, the space (or multi-dimensionally) adaptive overshoot-compensation unit 112 overshoot-compensates the sub-pixel data SVDS with the compensating rate that gradually increases towards the lower side from the upper side of the liquid crystal panel 102. Further, the space (or multi-dimensionally) adaptive overshoot-compensation unit 112 overshoot-drive-compensates the sub-pixel data SVDS with the compensating rate having a difference which corresponds to the difference between the gamma characteristics of the sub-frames. To overshoot-drive-compensate the sub-pixel data SVDS depending on the areas of the liquid crystal panel 102 and the sub-frames, the space (or multi-dimensionally) adaptive overshoot-compensation unit 112 is timing-controlled by the sub-horizontal sync signal SHsync and the sub-vertical sync signal SVsync from the timing controller 108. Alternatively, the space (or multi-dimensionally) adaptive overshoot-compensation unit 112 may also be timing-controlled by the gate control signals GCS including the gate start pulse having the frequency identical to that of the sub-vertical sync signals SVsync and the gate clock having the frequency identical to that of the sub-horizontal sync signal SHsync from the timing controller 108.

The different overshoot-drive-compensation in accordance with each area of the panel 102 by the space (or multi-dimension) adaptive overshoot-compensation unit 112 enables the sub-pixels to reach the arrangement state corresponding to the sub-pixel data SVDS at speed that gradually becomes faster as the sub-pixels on the liquid crystal panel get closer to the lower side from the upper side. Accordingly, the sub-pixels on the liquid crystal panel 102 are on the arrangement state corresponding to the sub-pixel data SVDS at almost equal time points. Therefore, it is possible that the brightness of the image on the liquid crystal panel 102 is uniform, and the color image corresponding to the video data are expressed clearly. Furthermore, the sub-pixels on the liquid crystal panel 102 reach the arrangement state corresponding to the sub-pixel data SVDS at different speed in accordance with the first and the second sub-frames (the odd-numbered and even-numbered sub-frames). Accordingly, the difference of the gamma characteristics between the sub-pixel data SVDS of the first sub-frame and the sub-pixel data SVDS of the second frame is corrected or compensated. Therefore, the color reproduction rate of the image displayed on the liquid crystal panel 102 becomes enhanced.

As the sub-pixel data is overshoot-drive-compensated with different compensation rate in accordance with the area of the panel 102 and the sub-frames, the liquid crystal display device 100 may enhance the color reproduction rate as well as maintain the brightness of the image evenly. Therefore, the liquid crystal display device 100 may display color image of high quality.

Figure 4:
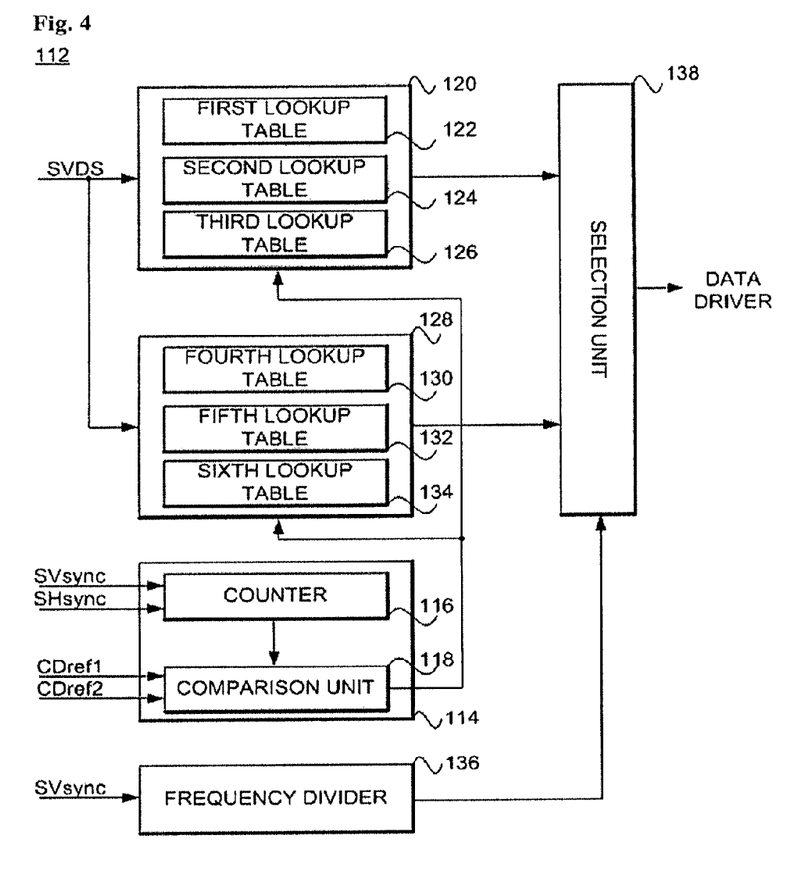
FIG. 4 is a detailed block diagram illustrating a space fitness excessive compensation unit for use with the liquid crystal display device of FIG. 3.

FIG. 4 is a block diagram illustrating the space adaptive overshoot-compensation unit 112 of FIG. 3 in detail. For example. 480 gate lines GL1 to GL 480 are arranged on the liquid crystal panel 102 in FIG. 3. The liquid crystal panel 102 is driven by sub-pixel drive signals overshoot-drive-compensated with compensation rate different for each area as separated as equal size of first to third areas A to C. In this case, the first area A includes a first to 160th gate lines GL1 to GL160, the second area B includes 161th to 320th gate lines GL 161 to GL 320, and the third area C includes 321th to 480th gate lines GL321 to GL 480.

Referring to FIG. 4, the space (or multi-dimensionally) adaptive overshoot-compensation unit 112 includes an area decision unit 114 generating an area selection signal by using the sub-horizontal and sub-vertical sync signals SHsync and SVsync from the timing controller 108; a first and a second memories 120 and 128 overshoot-compensating the sub-pixel data SVDS from the timing controller 108 with different compensating rates in response to the area selection signal from the area decision unit 114; a selection unit 138 supplying selectively the overshoot-drive-compensated sub-pixel data from the first and the second memory 120 and 128 to the data driver 106 of FIG. 3; and a frequency divider 136 controlling the selecting operation of the selection unit 138.

The area decision unit 114 detects area (one of the first to the third areas A to C) on the liquid crystal panel 102 on which the sub-pixel data SVDS for one line is recorded by using the sub-vertical and the sub-horizontal sync signals SVsync and SHsync, and generates the area selection signal designating one of the first to third areas A to C with the detected result. The area selection signal selects the overshoot-drive-compensation rate of the sub-pixel data SVDS which is supplied from the timing controller 108 to the first and second memories 120 and 128.

The counter 116 is initialized every blanking period of the sub-vertical sync signal SVsync or when the gate start pulse is input, and counts the number of the sub-horizontal sync signal SHsync (or the gate clock) during the scanning period of the sub-vertical sync signal SVsync. The count value from the counter 116 indicates positions of the sub-pixels on the liquid crystal panel 102 where the sub-pixel data SVDS for one line is to be supplied to the data driver 106 during the sub-frame. The count value of the counter 116 is supplied to the comparison unit 118.

The comparison unit 118 compares the count value from the counter 116 with a first reference value CDref1 and a second reference value CDref1 and decides whether the sub-pixel data SVDS for one line supplied to the data driver 106 will be written at any one of the first to third areas A to C of the liquid crystal panel 102. According to the decision, the comparison unit 118 supplies the area selection signal of the logic value designating the decided area to the first and the second memories 120 and 128. The first and second reference values CDref1 and CDref2 are previously stored in memory elements (not shown) such as registers, respectively. The first reference value CDref1 may be one of the boundary values dividing the first area A and the second area B (for example, 160 and 161), and the second reference value CDref2 may be one of the boundary values dividing the second area B and the third area C (for example, 320 and 321).

The first memory 120 has first to third lookup tables 122, 124 and 126 corresponding to the first to the third areas A to C on the liquid crystal panel 102, and the second memory 128 has fourth to sixth lookup tables 130, 132 and 134 corresponding to the first to the third areas A to C on the liquid crystal panel 102. The first to the sixth lookup tables 122 to 134 stores the overshoot-drive-compensated sub-pixel data (i.e., sub-pixel compensation data) which corresponds to the gray scale values of the sub-pixel data SVDS. The sub-pixel compensation data in the first lookup table 122 has the gray scale values compensated with the overshoot-drive-compensation rate lower than the sub-pixel compensation data in the second lookup table 124, and the sub-pixel compensation data in the second lookup table 124 has the gray scale values compensated with the overshoot-drive-compensation rate lower than the sub-pixel compensation data in the third lookup table 126. Likewise, the sub-pixel compensation data in the fourth lookup table 130 has the gray scale values compensated with the overshoot-drive-compensation rate lower than the sub-pixel compensation data in the fifth lookup table 132, and the sub-pixel compensation data on the fifth lookup table 132 has the gray scale values compensated with the overshoot-drive-compensation rate lower than the sub-pixel compensation data in the sixth lookup table 134. On the other hand, the sub-pixel compensation data in the first to the third lookup tables 122 to 126 has the gray scale values compensated with the overshoot-drive-compensation rate different from the sub-pixel compensation data in the fourth to the sixth lookup tables 130 to 134. The difference of the compensation rate between the sub-pixel compensation data on the first to the third lookup tables 122 to 126 and the sub-pixel compensation data on the fourth to the sixth lookup tables 130 to 134 corresponds to the difference between the gamma characteristics of the sub-pixel data SVDS of the first sub-frame and the sub-pixel data SVDS of the second sub-frame.

The first memory 120 as above selects one of the first to third lookup tables 122, 124 and 126 in accordance with the logic value of the area selection signal from the comparison unit 118. The sub-pixel compensation data corresponding to the gray scale value of the sub-pixel data SVDS is selected by selecting one of the first to the third lookup tables 122, 124 and 126 and is supplied to the selection unit 138. Likewise, the second memory 128 selects one lookup table of the fourth to the sixth lookup tables 130, 132 and 134 in accordance with the logic value of the area selection signal from the comparison unit 118. The sub-pixel compensation data corresponding to the gray scale value of the sub-pixel data SVDS is selected by selecting one of the fourth to the sixth lookup tables 130, 132 and 134 and is supplied from the timing controller 108 to the selection unit 138. The area selection signal of the logic value indicating selectively the first to third areas A to C of the liquid crystal panel 102 is used as an upper address selecting one of the first to third lookup tables 122, 124 and 126 in the first memory 120 and one of the fourth to the sixth lookup tables 130, 132 and 134 in the second memory 128. The sub-pixel data SVDS from the timing controller 108 is used as a lower address selecting the place to store the sub-pixel compensation data on each of the lookup tables.

When the value counted by the counter 116 is lower than the first reference value CDref1, the comparison unit 118 generates the area selection signals of logic value designating or indicating the first area A of the liquid crystal panel 102. Then, the first and second memories 120 and 128 recognize the sub-pixel data SVDS supplied as a data to be written on the sub-pixel on the first area A of the liquid crystal panel 102. The first memory 120 allows the sub-pixel compensation data on the first lookup table 122 to be supplied to the selection unit 138 as a data overshoot-drive-compensating the sub-pixel data SVDS from the timing controller 108. The second memory 128 also allows the sub-pixel compensation data on the fourth lookup table 130 to be supplied to the selection unit 138 as a data overshoot-drive compensating the sub-pixel data SVDS from the timing controller 108.

When the value counted by the counter 116 corresponds to the value between the first and the second reference values CDref1 and CDref2, the comparison unit 118 generates the area selection signal of the logic value designating or indicating the second area B of the liquid crystal panel 102. Then, the first and the second memories 120 and 128 recognize the sub-pixel data SVDS supplied from the timing controller 108 as a data to be written at the sub-pixel on the second area B of the liquid crystal panel 102. The first memory allows the sub-pixel compensation data on the second lookup table 124 to be supplied to the selection unit 138 as a data overshoot-drive-compensating the sub-pixel data SVDS from the timing controller 108. The second memory 128 also allows the sub-pixel compensation data on the fifth lookup table 132 to be supplied to the selection unit 138 as a data overshoot-drive-compensating the sub-pixel data SVDS from the timing controller 108.

Furthermore, when the count value from the counter 116 is higher than the second reference value CDref2, the comparison unit 118 generates the area selection signal of the logic value designating or indicating the third area C of the liquid crystal panel 102. In this case, the first and the second memories 120 and 128 recognize the sub-pixel data SVDS supplied as a data to be written at the sub-pixel on the third area of the liquid crystal panel 102. The first memory 120 allows the sub-pixel compensation data on the third lookup table 126 to be supplied to the selection unit 138 as a data overshoot-drive-compensating the sub-pixel data SVDS from the timing controller 108. The second memory 128 also allows the sub-pixel compensation data on the sixth lookup table to be supplied to the selection unit 138 as a data overshoot-drive-compensating the sub-pixel data SVDS from the timing controller 108.

The sub-pixel data SVDS is compensated with the overshoot-drive-compensation rate that gradually increases towards the bottom side from the top side of the liquid crystal panel 102, the sub-pixels on the liquid crystal panel 102 may be driven by the overshoot-drive-compensated sub-pixel drive signals that becomes higher towards the bottom side from the top side of the liquid crystal panel 102. The sub-pixels may reach the arrangement state corresponding to the sub-pixel data SVDS at the speed which is faster towards the bottom side than the top side on the liquid crystal panel 102. Accordingly, the sub-pixels on the liquid crystal panel 102, regardless of their location, may be in the uniform arrangement state corresponding to the sub-pixel data SVDS when the light from the backlight unit 107 reaches the liquid crystal panel 102. Therefore, the brightness of the image on the liquid crystal panel 102 becomes uniform, and the color image corresponding to the video data to be displayed correctly. Furthermore, the quality of the color image displayed on the liquid crystal panel 102 becomes enhanced.

The frequency divider 136 generates a data selection signal by frequency dividing the sub-vertical sync signal SVsync into one half. The data selection signal has a waveform that the logic condition is reversed at every period of the sub-vertical sync signal. For instance, if the data selection signal of high logic designates or indicates the first sub-frame period (for example, the odd-numbered sub-frame period), the data selection signal of low logic should designate or indicate the second sub-frame period (even-numbered sub-frame period). The data selection signal is supplied to the selection unit 138. The selection unit 138 allows the sub-pixel compensation data from the first memory 120 and the sub-pixel compensation data from the second memory 128 to be selectively supplied to the data driver 106 in FIG. 3 in response to the data selection signal from the frequency divider 136. The selection unit 138 supplies the sub-pixel compensation data from the first memory 120 to the data driver 106 during the first sub-frame period (the odd-numbered sub-frame period) that the data selection signal from the frequency divider 136 has the high logic. Alternatively, the selection unit 138 supplies the sub-pixels compensation data from the second memory 128 to the data driver 106 during the second sub-frame period (even-numbered sub-frame period) that the data selection signals from the frequency divider 136 have the low logic. A multiplexer, a controlled switch package, a two-input logic device package, etc. may be used for the selection unit 138 performing the selection. The frequency divider 136 and the selection unit 138 compensate the sub-pixel data SVDS to be supplied to the data driver 106 with different overshoot-drive-compensating rates in accordance with the sub-frames. The sub-pixel on the liquid panel 102 reaches the arrangement state corresponding to the sub-pixel data SVDS at the different speed in accordance with the sub-frames as the sub-pixel is driven by the sub-pixel drive signal compensated with the different compensation rate depending on the sub-frames. In other words, the sub-pixel on the liquid crystal panel 102 reaches the arrangement state corresponding to the sub-pixel data at the different speed according to the first and sub-frames (that is, the odd-numbered and even-numbered sub-frames). Accordingly, the difference of the gamma characteristics between the sub-pixel data SVDS of the first and the second frames is corrected or compensated. As a result, the reproduction of the color image displayed on the liquid crystal panel 102 is enhanced.

The space (or multi-dimensionally) adaptive overshoot-compensation unit 112 compensates the sub-pixel data SVDS with different overshoot-drive-compensation rate depending on the sub-frames. The overshoot-drive-compensation rate gradually increases depending on the areas on the liquid crystal panel 102. Through the space (or multi-dimensionally) adaptive overshoot-compensation unit 112, the sub-pixels (liquid crystal cells) on the liquid crystal panel 102 reach the arrangement state corresponding to the sub-pixel data SVDS at the speed which is faster towards the bottom from the top of the liquid crystal panel 102 and which is different depending on the sub-frames. Therefore, the brightness of the image on the liquid crystal panel 102 becomes even, and it is possible for the color image corresponding to the video data to be displayed correctly.

Figure 5:
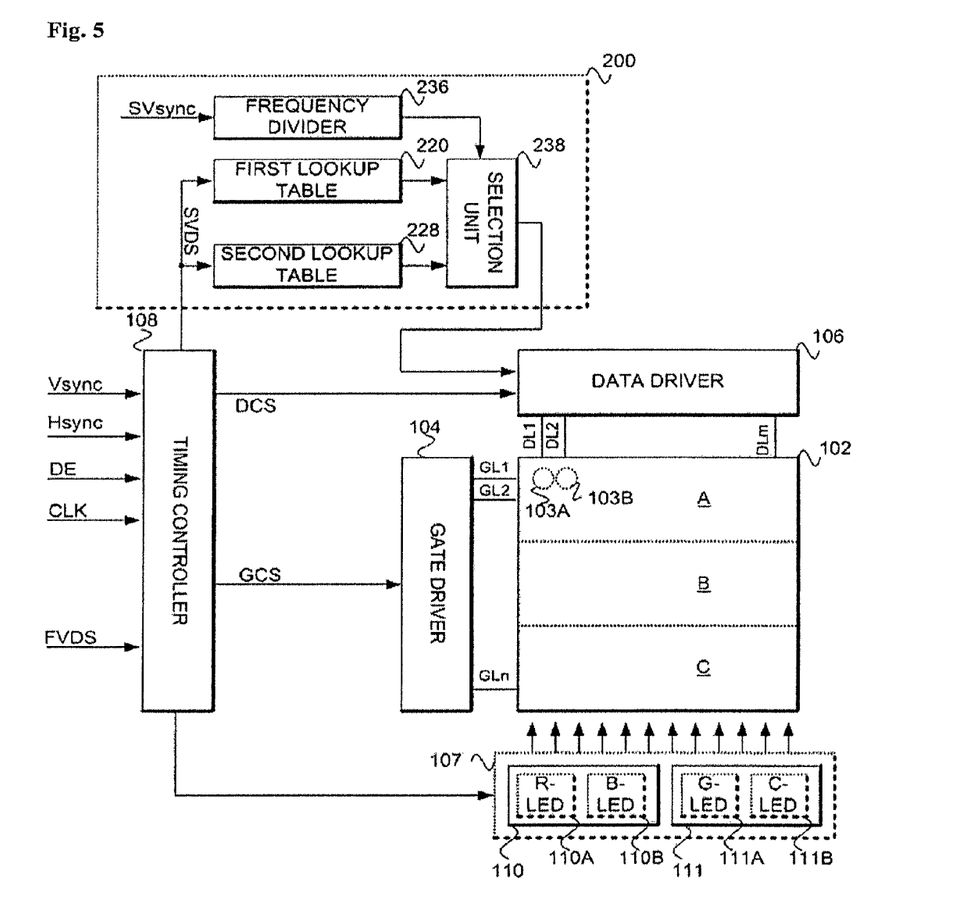
FIG. 5 is a block diagram illustrating the liquid crystal display device according to a second embodiment.

FIG. 5 is a block diagram illustrating the liquid crystal display device according to another embodiment of the present invention. The liquid crystal display device of FIG. 5 has the same configuration as the liquid crystal display device in FIG. 3 excepting that the space (or multi-dimension) adaptive overshoot-compensation unit 112 is replaced with the time base adaptive overshoot-compensation unit 200. The detailed description for the elements of FIG. 5 that has the same functions, drives and connections to them in FIG. 3 will be omitted, as it is described clearly in the description for FIG. 3. Further, the elements of FIG. 5 that has the same functions, drives and connections to them in FIG. 3 will be referred with the same referential numbers and terms.

The time base adaptive overshoot-compensation unit 200 overshoot-compensates the sub-pixel data SVDS with different compensation rates. The time base adaptive overshoot-compensation unit 200 overshoot-drive-compensates the sub-pixel data SVDS of the first sub-frame (the odd-numbered sub-frame) and the sub-pixel data SVDS of the second sub-frame (the even-numbered sub-frame) with the compensation rate having a difference corresponding to that between the gamma characteristics of the sub-frames. To overshoot-drive-compensate the sub-pixel data SVDS differently depending on the sub-frames, the time base adaptive overshoot-compensation unit 200 is timing-controlled by the sub-vertical sync signals from the timing controller 108. Alternatively, the time base adaptive overshoot-compensation unit 200 can be timing-controlled by the gate control signals GCS (i.e., the gate start pulse having the same frequency as that of the sub-vertical sync signals SVsync) from the timing controller 108.

The time base adaptive overshoot-compensation unit 200 includes a selection unit 238 which supplies selectively sub-pixel compensation data from first and second lookup tables 220 and 228 to the data driver 106, and a frequency divider 236 responding to the sub-vertical sync signal SVsync from the timing controller 108. Each of the first and second lookup tables 220 and 228 responds to the sub-pixel data SVDS from the timing controller 108 and applies the sub-pixel compensation data corresponding to the gray scale value of the sub-pixel data SVDS to the selection unit 238. To the conversion of the sub-pixel data SVDS, each of the first and second lookup tables 220 and 228 stores the sub-pixel compensation data (or sub-pixel compensation data set) in accordance with the gray scale values of the sub-pixel data. The sub-pixel compensation data in the first lookup table 220 has a gray scale value compensated differently from that in the second lookup table 228 in compensation rate. The difference between the sub-pixel compensation data of the first lookup table 220 and the sub-pixel compensation data of the second lookup table 228 corresponds to that of the gamma characteristics between the sub-pixel data SVDS of the first sub-frame and the sub-pixel data SVDS of the second sub-frame.

The frequency divider 236 generates a data selection signal by frequency dividing the sub-vertical sync signal SVsync from the timing controller 108. The data selection signal has a waveform that the logic condition is reversed at every period of the sub-vertical sync signal. For example, if the data selection signal of high logic designates or indicates the first sub-frame period (for example, the odd-numbered sub-frame period), the data selection signal of low logic should designate or indicate the second sub-frame period (even-numbered sub-frame period). The data selection signal is supplied to the selection unit 238.

The selection unit 238 allows the sub-pixel compensation data from the first lookup table 220 and the sub-pixel compensation data from the second lookup table 228 to be selectively supplied to the data driver 106 in FIG. 3 as responding to the data selection signal from the frequency divider 236. The selection unit 238 supplies the sub-pixel compensation data from the first lookup table 220 to the data driver 106 during the first sub-frame period (the odd-numbered sub-frame period) that the data selection signal from the frequency divider 236 has the high logic. Alternatively, the selection unit 238 supplies the sub-pixels compensation data from the second lookup table 228 to the data driver 106 during the second sub-frame period (even-numbered sub-frame period) that the data selection signals from the frequency divider 236 have the low logic. A multiplexer, a controlled switch package, a two-input logic device package etc. may be used for the selection unit 238 performing the operation. The frequency divider 236 and the selection unit 238 compensate the sub-pixel data SVDS to be supplied to the data driver 106 with different overshoot-drive-compensating rates in accordance with the sub-frames. The sub-pixel on the liquid panel 102 reaches the arrangement state corresponding to the sub-pixel data SVDS at the different speed in accordance with the sub-frames as the sub-pixel is driven by the sub-pixel drive signal compensated with the different compensation rate depending on the sub-frames. In other words, the sub-pixel on the liquid crystal panel 102 reaches the arrangement state corresponding to the sub-pixel data at the different speed according to the first and sub-frames (that is, the odd-numbered and even-numbered sub-frames). Accordingly, the difference in the gamma characteristics between the sub-pixel data SVDS of the first and the second frames is corrected or compensated. As a result, the reproduction of the color image displayed on the liquid crystal panel 102 may be enhanced.

The different overshoot-drive-compensation in accordance with the sub-frames by the time base adaptive overshoot-compensation unit 200 enables the sub-pixels on the liquid crystal panel 102 to reach the arrangement state corresponding to the sub-pixel data SVDS at different speed in accordance with the first and the second sub-frames (the odd-numbered and even-numbered sub-frames). Accordingly, the difference in the gamma characteristics between the sub-pixel data SVDS of the first sub-frame and the sub-pixel data SVDS of the second frame is corrected or compensated. Therefore, the color reproduction rate of the image displayed on the liquid crystal panel 102 becomes enhanced. Furthermore, the color image of high quality may be displayed on the liquid crystal panel 102.

Figure 6:
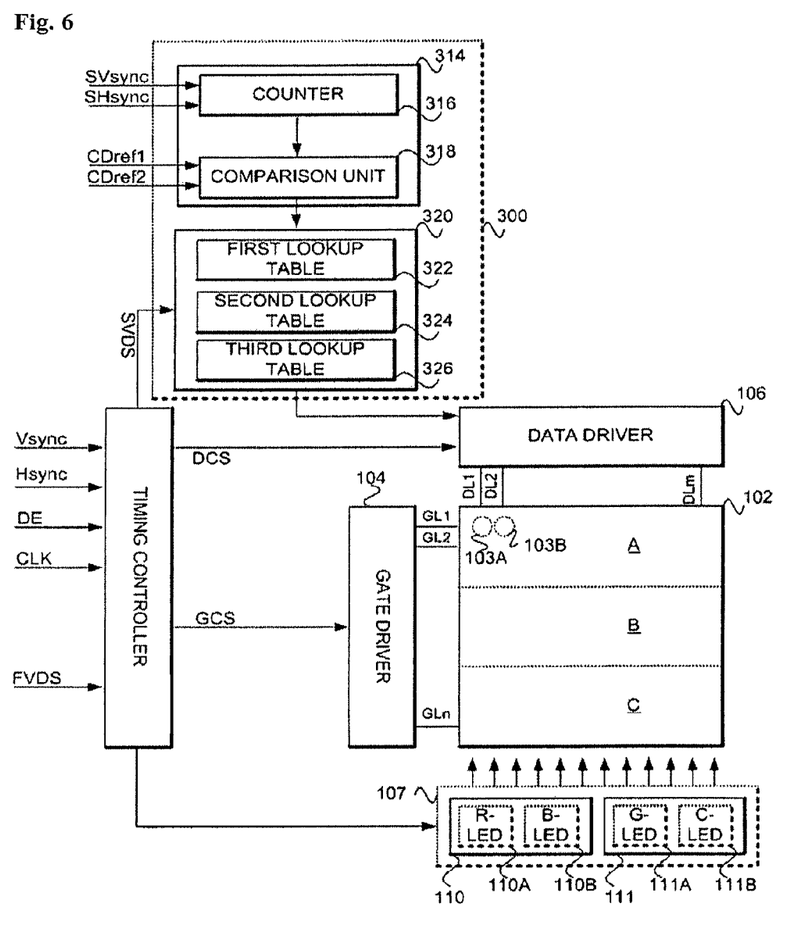
FIG. 6 is a block diagram illustrating a liquid crystal display device according to a third embodiment.

FIG. 6 is a block diagram illustrating the liquid crystal device according to a third embodiment of the present invention. The liquid crystal display device of FIG. 6 has the same configuration as the liquid crystal display device in FIG. 3 except that the space (or multi-dimension) adaptive overshoot-compensation unit 112 is replaced with a regionally adaptive overshoot-compensation unit 300. The detailed description for the elements of FIG. 6 that has the same functions, drives and connections to them in FIG. 3 will be omitted, as it is described clearly in the description for FIG. 3. Further, the elements of FIG. 6 that has the same functions, drives and connections to them in FIG. 3 will be referred with the same referential numbers and terms.

The regionally adaptive overshoot-compensation unit 300 overshoot-compensates the sub-pixel data SVDS to be supplied to the data driver 106 from the timing controller 108 with different compensation rates in accordance with the area of the liquid crystal panel 102. For example, the regionally adaptive overshoot-compensation unit 300 overshoot-compensates the sub-pixel data SVDS with the compensating rate which increases towards the lower side from the upper side of the liquid crystal panel 102. To overshoot-drive-compensate the sub-pixel data SVDS depending on the areas of the liquid crystal panel 102, the regionally adaptive overshoot-compensation unit 300 is timing-controlled by the sub-horizontal sync signal SHsync and the sub-vertical sync signal SVsync from the timing controller 108. Alternatively, the regionally adaptive overshoot-compensation unit 300 can be timing-controlled by the gate control signals GCS (the gate start pulse having the same frequency as that of sub-vertical sync signals SVsync and the gate clock having the same frequency as that of the sub-horizontal sync signal SHsync from the timing controller 108.

The different overshoot-drive-compensation in accordance with each area of the panel 102 by the regionally adaptive overshoot-compensation unit 300 enables the sub-pixels to reach the arrangement state corresponding to the sub-pixel data SVDS at speed that gradually becomes faster as the sub-pixels on the liquid crystal panel get closer to the lower side from the upper side. Accordingly, the sub-pixels on the liquid crystal panel 102 are in the uniform arrangement state corresponding to the sub-pixel data SVDS when the light from the backlight unit 107 reaches the liquid crystal panel 102. Therefore, it is possible that the brightness of the image on the liquid crystal panel 102 is uniform, and the color image corresponding to the video data are expressed clearly. As a result, the sub-pixels on the liquid crystal panel 102 may become faster in response speed and the quality of the color image displayed on the liquid crystal panel 102 is enhanced.

The regionally adaptive overshoot-compensation unit 300 includes an area decision unit 314 generating an area selection signal as using the sub-horizontal and sub-vertical sync signals SHsync and SVsync from the timing controller 108; a memory 320 overshoot-compensating the sub-pixel data SVDS from the timing controller 108 with different compensating rates in response to the area selection signal from the area decision unit 314. The area decision unit 314 detects area (one of the first to the third areas A to C) on the liquid crystal panel 102 on which the sub-pixel data SVDS for one line is written as using the sub-vertical and the sub-horizontal sync signals SVsync and SHsync, and generates the area selection signal designating one of the first to third areas A to C with the detected result. The area selection signal selects the overshoot-drive-compensation rate of the sub-pixel data SVDS to be supplied from the timing controller 108 to the memory 320.

The counter 316 is initialized at every blanking period of the sub-vertical sync signal SVsync (or when the gate start pulse is input), and counts the number of the sub-horizontal sync signal SHsync (or the gate clock) during the scanning period of the sub-vertical sync signal SVsync. The count value from the counter 316 indicates the positions of the sub-pixels on the liquid crystal panel 102 on which the sub-pixel data SVDS for one line is to be supplied to the data driver 106 during the sub-frame. The count value of the counter 316 is supplied to the comparison unit 318.

The comparison unit 318 compares the count value from the counter 316 with a first reference value CDref1 and a second reference value CDref1 and decides whether the sub-pixel date SVDS for one line supplied to the data driver 106 will be written at one of the first to third areas A to C of the liquid crystal panel 102. According to the decision, the comparison unit 318 supplies the area selection signal of the logic value designating the decided area to the memory 320. The first and second reference values CDref1 and CDref2 are previously stored in memory elements (not shown) such as registers, respectively. The first reference value CDref1 may be one of the boundary values dividing the first area A and the second area B (for example, 160 and 161), and the second reference value CDref2 may be one of the boundary values dividing the second area B and the third area C (for example, 320 and 321).

The memory 320 has first to third lookup tables 322, 324 and 326 corresponding to the first to the third areas A to C on the liquid crystal panel 102. The first to the third lookup tables 322 to 326, store the overshoot-drive-compensated sub-pixel data (i.e., sub-pixel compensation data set) as corresponding to the gray scale values of the sub-pixel data SVDS. The sub-pixel compensation data on the first lookup table 322 has the gray scale values compensated with the overshoot-drive-compensation rate lower than the sub-pixel compensation data on the second lookup table 324, and the sub-pixel compensation data on the second lookup table 324 has the gray scale values compensated with the overshoot-drive-compensation rate lower than the sub-pixel compensation data on the third lookup table 326.

The memory 320 as above selects one of the first to third lookup tables 322, 324 and 326 in accordance with the logic value of the area selection signal from the comparison unit 318. The lookup table selected among the first to the third lookup tables 322, 324 and 326 applies the sub-pixel compensation data corresponding to the gray scale value of the sub-pixel data SVDS from the timing controller 108 to the data driver 106. Then, the area selection signal of the logic value indicating selectively the first to third areas A to C of the liquid crystal panel 102 is used as an upper address selecting one of the first to third lookup tables 322 to 326 in the memory 320. The sub-pixel data SVDS from the timing controller 108 is used as a lower address selecting the place to store the sub-pixel compensation data on each of the lookup tables 322 to 326.

As the memory 320 compensates the sub-pixel data SVDS with the overshoot-drive-compensation rate that gradually increases towards the bottom side from the top side of the liquid crystal panel 102, the sub-pixels on the liquid crystal panel 102 are driven by the overshoot-drive-compensated sub-pixel drive signals that becomes higher towards the bottom side from the top side of the liquid crystal panel 102, and reach the arrangement state corresponding to the sub-pixel data SVDS at the speed which gradually becomes faster towards to the bottom side from the top side on the liquid crystal panel 102. Accordingly, the sub-pixels on the liquid crystal panel 102 are in the uniform arrangement state corresponding to the sub-pixel data SVDS when the light from the backlight unit 107 reaches the liquid crystal panel 102. Therefore, the brightness of the image on the liquid crystal panel 102 becomes uniform, and it is possible for the color image corresponding to the video data to be displayed correctly. Furthermore, the quality of the color image displayed on the liquid crystal panel 102 becomes enhanced.

As previously described in the embodiments, the different overshoot-drive-compensation in accordance with each area of the panel enables the sub-pixels to reach the arrangement state corresponding to the sub-pixel data at speed that gradually becomes faster as the sub-pixels on the liquid crystal panel get closer to the lower side from the upper side. The sub-pixels on the liquid crystal panel 102 may have the uniform arrangement state corresponding to the sub-pixel data of a given time (i.e., when the light from the backlight unit 107 reaches the liquid crystal panel 102). Therefore, it is possible that the brightness of the image on the liquid crystal panel 102 is uniform, and the color image corresponding to the video data are expressed clearly. As a result, the quality of the image displayed on the liquid crystal panel is enhanced.

Also, the liquid crystal display device enables the sub-pixel data to be overshoot-drive-compensate in different compensation rates depending on the sub-frames. The sub-pixels on the liquid crystal panel reach the arrangement state corresponding to the sub-pixel data at different speed in accordance with the first and the second sub-frames (the odd-numbered and even-numbered sub-frames). The difference of the gamma characteristics between the sub-pixel data of the first sub-frame and the sub-pixel data of the second frame is corrected or compensated. Therefore, the color reproduction rate of the image displayed on the liquid crystal panel 102 becomes enhanced and the quality of the image displayed on the liquid crystal panel is enhanced.

Furthermore, the liquid crystal display device according may allow the sub-pixel data to be overshoot-drive-compensate with different compensation rates depending on the sub-frames and the areas of the liquid crystal panel. The color reproduction rate as well as the brightness uniformity of the image enhanced. Therefore, the liquid crystal display device may have the faster response speed. The higher quality of the color image may be displayed.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A liquid crystal display device for compensating a pixel data in accordance with areas of a liquid crystal display panel and sub-frames comprising:
    a liquid crystal panel having a plurality of gate lines, a plurality of data lines, a plurality of color pixels, each of the color pixels including two sub-pixels which represent two different colors;
    a timing controller controlling a gate driver and a data driver, and receiving a sub-pixel data stream of two sub-frame format that includes a first sub-pixel data for a first sub-frame and a second sub-pixel data for a second sub-frame, the first sub-pixel data and the second sub-pixel data having different gamma characteristics;
    the data driver driving the plurality of data lines of the liquid crystal panel; and
    a time base adaptive overshoot-compensation unit that overshoot-drive-compensates the sub-pixel data of the first sub-frame and the sub-pixel data of the second sub-frame received from the timing controller, with the compensation rate having a difference corresponding to that between the gamma characteristics of the sub-frames, the time base adaptive overshoot-compensation unit including:
        a first look up table storing a first compensation sub-pixel data compensated in accordance with a first gray scale value of the sub-pixel data for the first sub-frame;
        a second look up table storing a second compensation sub-pixel data compensated in accordance with a second gray scale value of the sub-pixel data for the second sub-frame;
        wherein the sub-pixel compensation data in the first lookup table has a gray scale value compensated differently from that in the second lookup table in compensation rate,
        wherein the difference between the sub-pixel compensation data of the first lookup table and the sub-pixel compensation data of the second lookup table corresponds to that of the gamma characteristics between the sub-pixel data of the first sub-frame and the sub-pixel data of the second sub-frame,
        a selection unit which supplies selectively the first and second compensation sub-pixel data from the first and second look up tables, respectively to the data driver; and
        a frequency divider generating a data selection signal by frequency dividing a sub-vertical sync signal from the timing controller, the frequency divider receiving and responding to the sub-vertical sync signal output from the timing controller to generate and supply the data selection signal to the selection unit,
    wherein the selection unit selects one of the first compensation sub-pixel data from the first look up table and the second compensation sub-pixel data from the second look up table in response to the logic condition of the data selection signal and supplies the selected compensation sub-pixel data to the data driver.

2. The liquid crystal display device according to claim 1, wherein the first compensation sub-pixel data in the first look up table has the first gray scale value compensated differently from that in the second look up table in compensation rate.

3. The liquid crystal display device according to claim 2, wherein the difference between the first compensation sub-pixel data and the second compensation sub-pixel data corresponds to that of the gamma characteristics between the sub-pixel data of the first sub-frame and the sub-pixel data of the second sub-frame.

4. The liquid crystal display device according to claim 1, wherein the first sub-frame comprises odd-numbered sub-frames and the second sub-frame comprises even-numbered sub-frames, and the compensation unit selectively uses one of two different rates during the odd numbered sub-frames and the other rate during the even-numbered sub-frames.

5. The liquid crystal display device according to claim 1, wherein the frequency divider generates the data selection signal to control the selection unit depending on the first and second sub-frames, the data selection signal has a waveform that the logic condition is reversed at every period of the sub-vertical signal.

6. The liquid crystal display device according to claim 1, wherein the first compensation sub-pixel data is supplied to the data driver for the first sub-frame, and the second compensation sub-pixel data is supplied to the data driver for the second sub-frame.

7. A method for driving a liquid crystal display device for compensating a pixel data in accordance with areas of a liquid crystal display panel and sub-frames, the method comprising:
    controlling by a timing controller, a gate driver and a data driver for the liquid crystal display device;

receiving by the timing controller, a stream of the pixel data in a two sub-frame format, wherein the two sub-frame format comprises a first sub-frame format representing a first sub-pixel data with a first gamma characteristic and a second sub-frame format representing a second sub-pixel data with a second gamma characteristic, wherein the first sub-pixel data and the second sub-pixel data each having different colors and the first gamma characteristic being different than the second gamma characteristic;

compensating the first sub-pixel data and the second sub-pixel data by a time base adaptive overshoot-compensation unit, wherein the compensating comprising:

overshoot-drive-compensating the first sub-pixel data of the first sub-frame format with a first compensating rate in accordance with the first gamma characteristic, and generating a first compensation sub-pixel data corresponding to a first compensation results;

overshoot-drive-compensating the second sub-pixel data of the second sub-frame format with a second compensating rate in accordance with the second gamma characteristic, and generating a second compensation sub-pixel data corresponding to a second compensation results;

wherein the first compensation sub-pixel data has a gray scale value compensated differently from that the second compensation sub-pixel data, wherein a difference between the first compensation sub-pixel data and the second compensation sub-pixel data corresponds to that of the gamma characteristics between, the sub-pixel data of the first sub-frame and the sub-pixel data of the second sub-frame, generating a data selection signal in response to a sub-vertical sync signal from the timing controller to select one of the first compensation sub-pixel data and the second compensation sub-pixel data;

supplying the selected first or second compensation sub-pixel data to a drive circuit for driving the liquid crystal display panel; and displaying an image corresponding to the selected first or second compensation sub-pixel data on the liquid crystal panel, wherein the data selection signal is generated by frequency dividing the sub-vertical sync signal from the timing controller, wherein the selected first or second compensation sub-pixel data is selected in response to the logic condition of the data selection signal.

8. The method according to claim 7, wherein the first compensation sub-pixel data has a gray scale value compensated differently from the second compensation sub-pixel data in compensation rate.

9. The method according to claim 7, wherein the first compensation sub-pixel data is supplied to the data driver for the first sub-frame, and the second compensation sub-pixel data is supplied to the data driver for the second sub-frame.

10. The method according to claim 7, wherein compensating the sub-pixel data stream comprises:

selecting a first compensation rate during odd-numbered sub-frames; and selecting a second compensation rate during even-numbered sub-frames.

11. The method according to claim 10, wherein the difference between the first compensation rate and the second compensation rate corresponds to the difference in the first gamma characteristic during the odd numbered-sub-frames and the second gamma characteristics during the even-numbered sub-frames.

* * * * *